Jan. 7, 1930.  R. LANDIS  1,742,547
UNIVERSAL JOINT
Filed April 8, 1927  2 Sheets-Sheet 1

Robert Landis INVENTOR.
BY
ATTORNEY.

Jan. 7, 1930.   R. LANDIS   1,742,547
UNIVERSAL JOINT
Filed April 8, 1927   2 Sheets-Sheet 2

Robert Landis INVENTOR.
BY
ATTORNEY.

Patented Jan. 7, 1930

1,742,547

UNITED STATES PATENT OFFICE

ROBERT LANDIS, OF WASHINGTON, DISTRICT OF COLUMBIA

UNIVERSAL JOINT

Application filed April 8, 1927. Serial No. 182,069.

My invention relates, in its broad aspect, to improvements in universal joints of the type exemplified by overlapping parts and a ball member arranged between the same. More particularly my invention is designed to provide against improper fitting of the parts, due to wearing of their meeting surfaces, and the like, and to this end the ball member, which is disposed between said overlapping parts, is grooved and the said parts arranged to fit in the grooves of said ball.

By uniquely positioning the cooperating parts, I am enabled to attain primary vertical and horizontal relative movement between the parts, and movement in certain other angles from the primary and the horizontal planes hereinbefore specified.

Furthermore, there is interposed a spring element between the sectional shank portions of one of said cooperating parts, whereby said part is normally forced against the ball member, to effectively supplement the ball in eliminating improper fit between the parts.

Other and equally important advantages of my invention may be briefly defined as follows; (1), I have provided a shell about the joined portions of the aforementioned parts, which has unique means for properly, effectively, and at all times, maintaining lubrication of said parts. (2), I provide unique means for preventing escape of the lubricating substance. (3), My entire joint is formed of only three pieces which may be cast and machined at relatively small cost and assembled ready for operation in a minimum amount of time. (4), My invention may be assembled and sold as a unit for incorporation as a spare part or as a replacement, or as an essential part in any machine, or device or apparatus wherein the utilization of a universal connection is indicated.

The particular elements of my device, employed to accomplish the above, will be hereinafter described in detail and pointed out in the claim appended hereto and forming a part of this specification.

In the accompanying drawings, wherein is illustrated preferred embodiment of my invention Fig. 1 is a vertical section thereof;

In the drawings wherein like characters of reference are used to designate like or similar parts throughout the several views.

Figure 1:
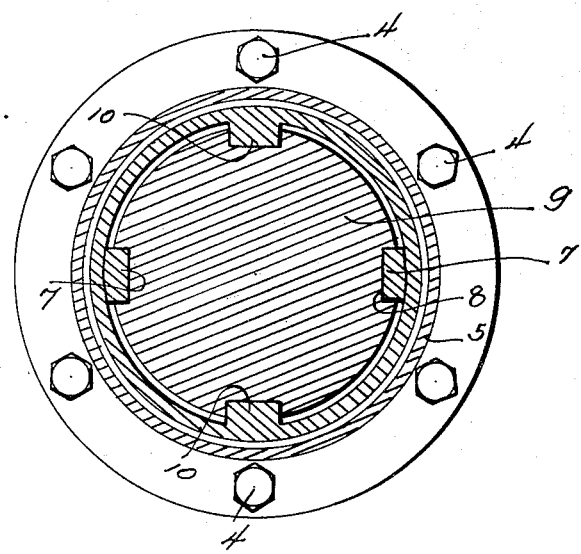

The numeral 1 designates a shaft element as also does the numeral 2, my universal connection being interposed between the two. The shaft element 1 has a face plate 3 thereon to which is bolted as at 4 the shell 5 and the female portion or element 6 of my universal connection. The portion 6 being flanged and received between the portions 3 and 5. The female element 6 has a semicircular rib 7 formed integral therewith. Said rib is adapted to fit into any two of the four surface grooves 8 in a ball member 9, said surface grooves being at right angles to each other. Fitting into the other two of said grooves 8 in ball member 9 are the ribs 10 of the male element 11 of my universal coupling and said male element 11 has a shank 12 for receiving the shaft member 2. A spring 13 being provided and held within a sleeve 14 for normally forcing the male element 11 hard against the ball 9. The shank 12 is interiorly splined at 20 to prevent rotation of the shaft 2 with respect thereto while allowing limited sliding movement.

Sleeve 14 is provided with an in-turned annular flange 22, adapted to bear against an annular rib 21, carried by the shaft 2 and is adapted to provide a backing for the spring 13, the forward end of the spring engaging the end of the shank 12 for the purpose heretofore set forth.

The shell 5 is formed to provide a chamber 16 for receiving grease and the like to serve as a lubricant and a plugged passage is formed therein for filling the shell with grease. Suitable packing members 18 are provided in the shell for preventing escape of grease therefrom.

Figure 2:
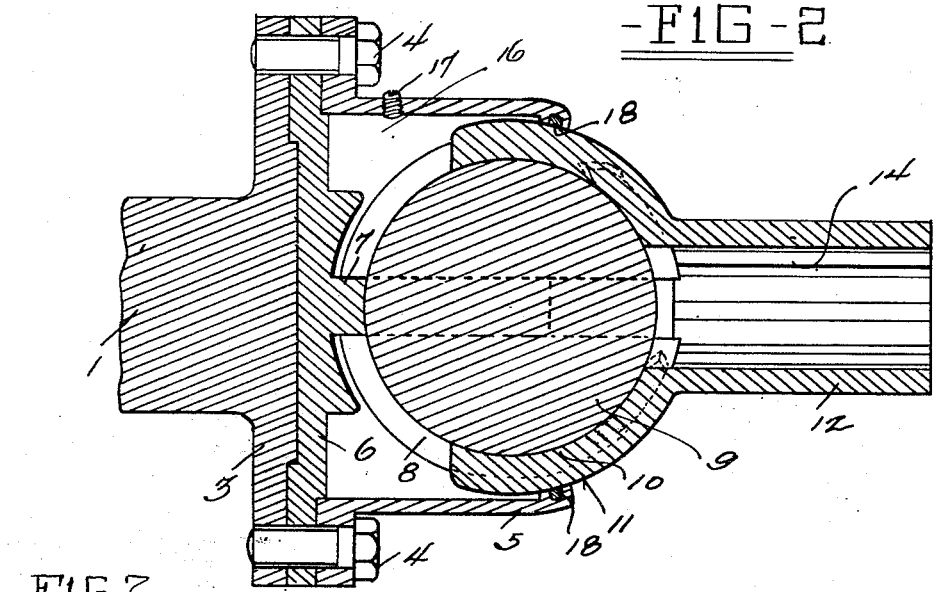
Fig. 2 is a horizontal section thereof.
Figure 7:
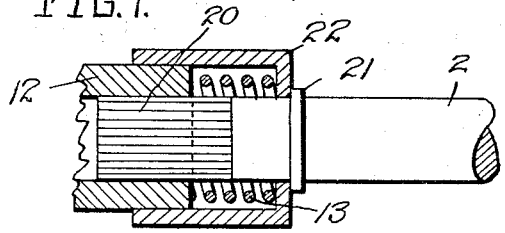
Fig. 7 is a fragmentary, longitudinal, medial, sectional view of Fig. 4.
Figure 3:
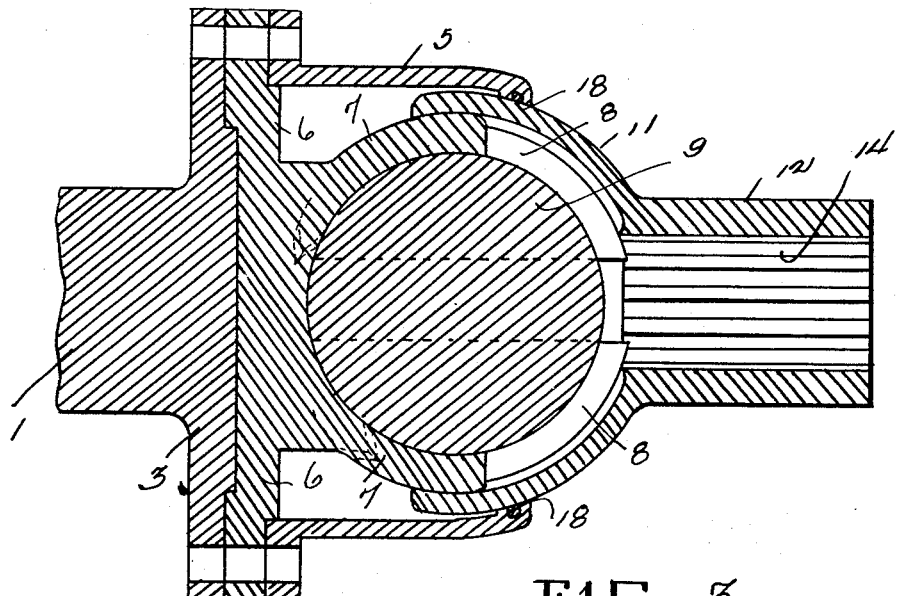
Fig. 3 is a transverse section thereof and illustrates the interfitting ribs and grooves.
Figure 4:
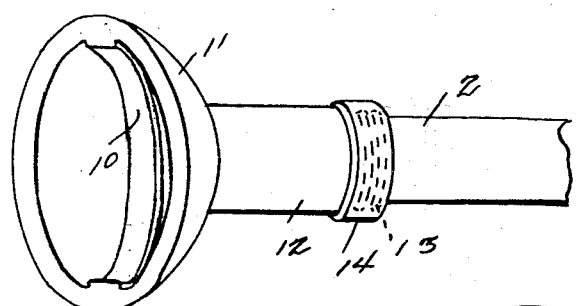
Fig. 4 is a perspective view of the male portion of my joint.
Figure 6:
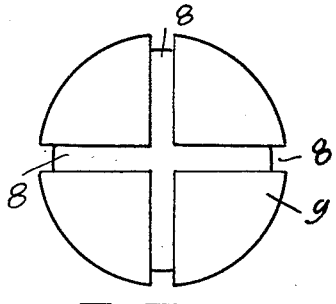
Fig. 6 is a perspective view of the ball connection.
Figure 5:
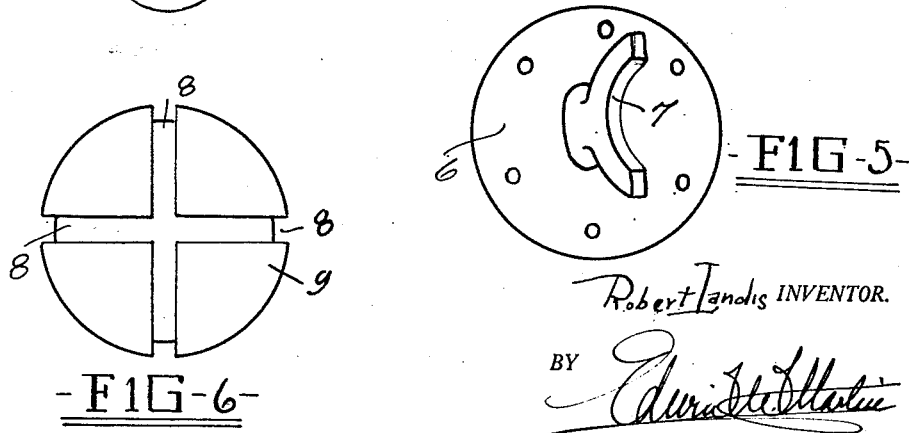
Fig. 5 is a perspective view of the female portion of my joint.

In operation the parts are assembled as is shown in Figs. 1 and 2 and the proper movement between the male and female elements 6 and 11 attained.

It is to be understood that the form of my invention herewith shown and described is to be taken as a preferred example of the same, and that various changes in the shape, size and arrangement of parts may be resorted to without departing from the spirit of the invention or the scope of the subjoined claim. It is also to be understood that while in the claim I have used the terms driving shaft and driven shaft, these terms are used for the purpose of defining the relation of parts to one or the other shaft and that the claim contemplates in its scope the interchangeability of the terms driving and driven throughout the claim.

Having thus described my invention, I claim:

In a universal connection, a driving shaft and a driven shaft, a pivot ball member having a pair of circular grooves arranged in quadrature, a hollow hemispherical member carried by the driven shaft shaped to fit over and receive within itself substantially half the ball member, a pair of arc shaped ribs integral with the hollow spherical member projecting inwardly from the inner walls thereof and fitting into one of the circular grooves in the ball on opposite sides of the ball, a semicircular rib member carried by the driving shaft and fitting within the other circular groove in the ball substantially half way around the ball, and an overall socket member carried by the driving shaft in fixed relation therewith encasing the other half of the ball and fitting over the outside of the said hemispherical member to make a substantially grease tight joint.

In testimony whereof, I affix my signature.

ROBERT LANDIS.